(12) United States Patent
Nakayasu et al.

(10) Patent No.: US 7,242,491 B2
(45) Date of Patent: Jul. 10, 2007

(54) PRINTING AGENT SERVICE METHOD AND SYSTEM

(75) Inventors: Hirofumi Nakayasu, Kawasaki (JP); Tetsu Takahashi, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 892 days.

(21) Appl. No.: 09/822,228

(22) Filed: Apr. 2, 2001

(65) Prior Publication Data
US 2002/0051178 A1 May 2, 2002

(30) Foreign Application Priority Data
Oct. 26, 2000 (JP) ............................. 2000-326810

(51) Int. Cl.
*G06F 15/00* (2006.01)
*G06K 1/00* (2006.01)
*G01C 21/30* (2006.01)

(52) U.S. Cl. ...................... 358/1.15; 701/209
(58) Field of Classification Search ...... 358/1.11–1.18, 358/1.1, 1.9; 399/196, 6; 701/209–210; 340/995, 995.1; 455/41.3; 709/203; 705/14
See application file for complete search history.

(56) References Cited

U.S. PATENT DOCUMENTS

| | | | |
|---|---|---|---|
| 5,506,661 A * | 4/1996 | Hanzawa | 399/1 |
| 5,898,680 A * | 4/1999 | Johnstone et al. | 370/316 |
| 6,247,130 B1 * | 6/2001 | Fritsch | 713/171 |
| 6,334,109 B1 * | 12/2001 | Kanevsky et al. | 705/14 |
| 6,404,994 B1 * | 6/2002 | Kawai et al. | 399/6 |
| 6,421,716 B1 * | 7/2002 | Eldridge et al. | 709/219 |
| 6,516,157 B1 * | 2/2003 | Maruta et al. | 399/8 |
| 6,522,971 B1 * | 2/2003 | Tanaka | 701/209 |
| 6,542,813 B1 * | 4/2003 | Kovacs | 701/208 |
| 6,549,625 B1 * | 4/2003 | Rautila et al. | 380/258 |
| 6,643,516 B1 * | 11/2003 | Stewart | 455/456.6 |

(Continued)

FOREIGN PATENT DOCUMENTS

JP 09-008821 1/1997

(Continued)

OTHER PUBLICATIONS

Notice of Reasons for Rejection dated Apr. 4, 2006.

*Primary Examiner*—Douglas Q. Tran
*Assistant Examiner*—Thierry L. Pham
(74) *Attorney, Agent, or Firm*—Westerman, Hattori, Daniels & Adrian, LLP.

(57) ABSTRACT

Disclosed is a printing agent service method for performing agent printing on a printing agent printer in accordance with a print request of a client terminal, and selects a printing agent printer that is nearest to a client. This method has the steps of receiving a print request and location information from a client terminal (1); retrieving the printing agent printer site (8-1) closest to the location of the client terminal (1) based on the location information; sending the nearest printing agent printer site (8-1) to the client terminal (1) for display; and receiving the printing agent printer site (8-1) specified from the above-mentioned client terminal (1), and sending the print data of the print request to a printer (11) at the specified printing agent printer site. Therefore, a client can easily select a printing agent printer that is close to his current location.

16 Claims, 14 Drawing Sheets

U.S. PATENT DOCUMENTS

| | | | |
|---|---|---|---|
| 6,647,267 B1 * | 11/2003 | Britt et al. | 455/404.2 |
| 6,809,831 B1 * | 10/2004 | Minari | 358/1.15 |
| 2004/0039641 A1 * | 2/2004 | Satomi et al. | 705/14 |

FOREIGN PATENT DOCUMENTS

| | | |
|---|---|---|
| JP | 10-078618 | 3/1998 |
| JP | 10-161961 | 6/1998 |
| JP | 10-191453 | 7/1998 |
| JP | 11-053142 | 2/1999 |
| JP | 11-65434 | 3/1999 |
| JP | 11-146118 | 5/1999 |
| JP | 11-167323 | 6/1999 |
| JP | 11-261592 | 9/1999 |
| JP | 11-309417 | 11/1999 |
| JP | 11-334180 | 12/1999 |
| JP | 2000-020270 | 1/2000 |
| JP | 2000-078328 | 3/2000 |

* cited by examiner

FIG. 5A  Display 'i-mode' contents
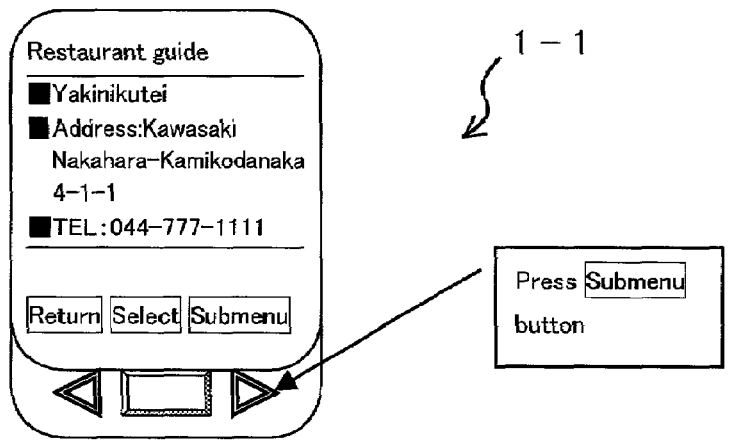
FIG. 5B
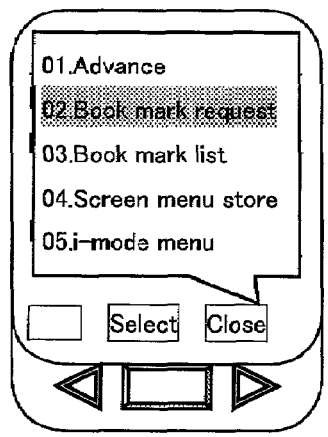
FIG. 5C
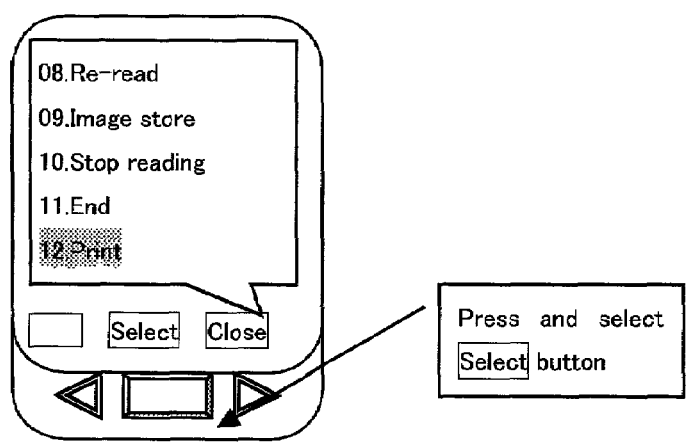

FIG. 7

```
Address: http://www.nifty.com/print_service/index.htm

Print service page

Procedure:
(1) Please designate your location
    · Latitude: [135° 00'00"]  Longitude: [35° 00'00"]
    · Zip code: [(Ex.: 206-8503)]
    · Telephone number: [(Ex.: 042-377-4111)]

(2) Please select desired printer (3) Please select desired print contents
```

FIG. 8

```
Address: http://www.nifty.com/print_service/1.htm

Print service page

Procedure:
(1) Please designate your location
    · Latitude: [135° 00'00"]  Longitude: [35° 00'00"]
    · Zip code: [(Ex.: 206-8503)]
    · Telephone number: [(Ex.: 042-377-4111)]

(2) Please select desired printer
⊚ Convenience A (Tokyo Inagi Daimaru xxxx, E135° 10'24"", N35° 22' 32" )
○ Convenience B (Tokyo Inagi Daimaru xxxx, E135° 11' 22" , N35° 25' 33 )
○ Convenience C (Tokyo Inagi Kohyohdai xxxx, E135° 12' 28" , N35° 21' 37" )

[ Select from map ]

(3) Please select desired print contents
```

Select 'convenience A'

PRINTING AGENT SERVICE METHOD AND SYSTEM

BACKGROUND OF THE INVENTION

1. Field of the Invention

The present invention relates to a printing agent service method and system for receiving a request for printing from a user and performing printing by proxy, and more particularly, to a printing agent service method and system, which a user accesses from an outside destination and printing is performed by proxy.

2. Description of the Related Art

Mobile equipment is being made smaller and multifunctional in line with the widespread use of the Internet. Ordinarily, since mobile equipment, such as cellular telephones and portable terminals (personal computers), are required to be compact and lightweight, output is limited to displays, and there are no printing functions.

However, there are cases in which one is using these mobile equipment, and wants to produce a printout. For example, there are cases in which one is using a cellular telephone and browsing the WWW (World Wide Web), and upon finding a restaurant or some other eating and drinking establishment or recreational facility, wants to print that information (for example, the distance to a destination, a map and the like) using a printer. There are also cases in which one is at an outside destination, and wants to print out a file from a portable terminal or the company's server to provide to a client. In addition, there are case in which the display of a cellular telephone or mobile personal computer is small and hard to read, and one wants a printout, and other cases in which one is surfing the web at home and wants to output information, but wants to perform this output via a color printer or highspeed printer that is not at home.

A printing agent system, which uses a network, has been proposed to deal with requirements like this (for example, Japanese Patent Application Laid-open No. 11-146118). In this proposed printing agent system, one accesses a service provider via a network from a portable terminal, and transmits print data to a server.

The server displays on the portable terminal a list of stores (for example, convenience stores) capable of acting as printing agents. The user goes to one of the stores listed, and when he inputs a password into a printer at that store, the above-mentioned print data is transmitted from the server to the printer, and the printer prints it out.

In this agent service system, a printout can be obtained by going to a printing agent store at an outside location.

However, in a conventional printing agent system, a user can query the server as to the location of a printing agent store, but a problem arises in that the user himself must find the nearest printing agent store from his outside location. It is not easy to find the nearest printing agent store in a shopping district or a place with which one is not familiar. This was one factor that retarded the convenience of the printing agent service.

SUMMARY OF THE INVENTION

Therefore, an object of the present invention is to provide a printing agent service method and a system therefor so that a user is easily cognizant of the nearest printing agent store, and receives agent printing services at the printing agent store thereof.

Further, another object of the present invention is to provide a printing agent service method and a system therefor so that the nearest printing agent store corresponding to the location of a client is specified, and agent printing services are received at the printing agent store thereof.

To achieve these objects, the printing agent service method of the present invention comprises the steps of receiving a print request and location information from a client terminal; retrieving the site of a printing agent printer closest to the location of the above-mentioned client terminal based on the above-mentioned location information; sending the above-mentioned nearest printing agent printer site to the above-mentioned client terminal for display; and receiving the printing agent printer site specified by the above-mentioned client terminal, and sending the print data of the above-mentioned print request to a printer at the above-mentioned specified printing agent printer site.

In the present invention, because the current location of a client terminal is detected, and a printing agent printer site that is close to the current location of the client terminal is retrieved and sent as a selection candidate to the client terminal, a client is able to readily select a printing agent printer that is near his current location. For this reason, a client can readily obtain a printout at a required location, making it easy for a service provider to increase service users.

Further, in the present invention, preferably a client can select the most optimum printing agent printer site in accordance with the above-mentioned sending step having a step, whereby map information indicating the above-mentioned nearest printing agent printer site is sent on the basis of the above-mentioned location information.

Furthermore, in the present invention, preferably the current location can be easily detected in accordance with the above-mentioned receiving step having a step for receiving GPS information from the above-mentioned client terminal.

Furthermore, in the present invention, preferably the printing agent printer site nearest to the current location can be found, even if the location information is not the absolute location, in accordance with the above-mentioned retrieving step having a step for retrieving the current location of the above-mentioned client terminal based on the above-mentioned location information, and a step for retrieving printing agent printer sites nearest to the above-mentioned current location.

Furthermore, in the present invention, preferably a client can be cognizant of printing results prior to arriving at a printer site by further having a step for receiving printing agent results from the above-mentioned printer and sending same to the above-mentioned client terminal.

Furthermore, in the present invention, preferably past selection results can be displayed on a priority basis, making the printing agent printer selection of the client easier by further having a step for receiving a user ID from the above-mentioned client terminal, and sending to the above-mentioned client terminal printing agent printer sites selected in the past by the user indicated by the above-mentioned user ID.

Furthermore, in the present invention, preferably the automatic payment of a printing agent fee is made possible by further having a step for automatically debiting a specified account for an agent printing fee in accordance with the above-mentioned agent printing results.

Furthermore, in the present invention, preferably a discount service can be achieved even with agent printing in accordance with printing that includes an advertisement by further having a step for instructing to the above-mentioned printer printing that includes an advertisement in accordance with a specification for printing that includes an advertisement from the above-mentioned client terminal, and a step for discounting a printing fee in accordance with the above-mentioned agent printing that includes an advertisement.

Furthermore, in the present invention, a client can be cognizant of a printing fee in advance by further having a step for sending to the above-mentioned client terminal an agent printing fee in accordance with the above-mentioned agent printing results.

BRIEF DESCRIPTION OF THE DRAWINGS

FIGS. 5(A), 5(B) and 5(C) are schematic diagrams (Part 1) of the operation of a portable terminal of FIG. 1;

FIG. 7 is a schematic diagram (Part 1) of the operation of a personal computer of FIG. 1;

FIG. 8 is a schematic diagram (Part 2) of the operation of a personal computer of FIG. 1;

DESCRIPTION OF THE PREFERRED EMBODIMENTS

The aspects of the embodiment of the present invention will be explained hereinbelow in the order of a printing agent service system, printing agent operation, and other aspects of the embodiment.

(Printing Agent Service System)

Figure 1:
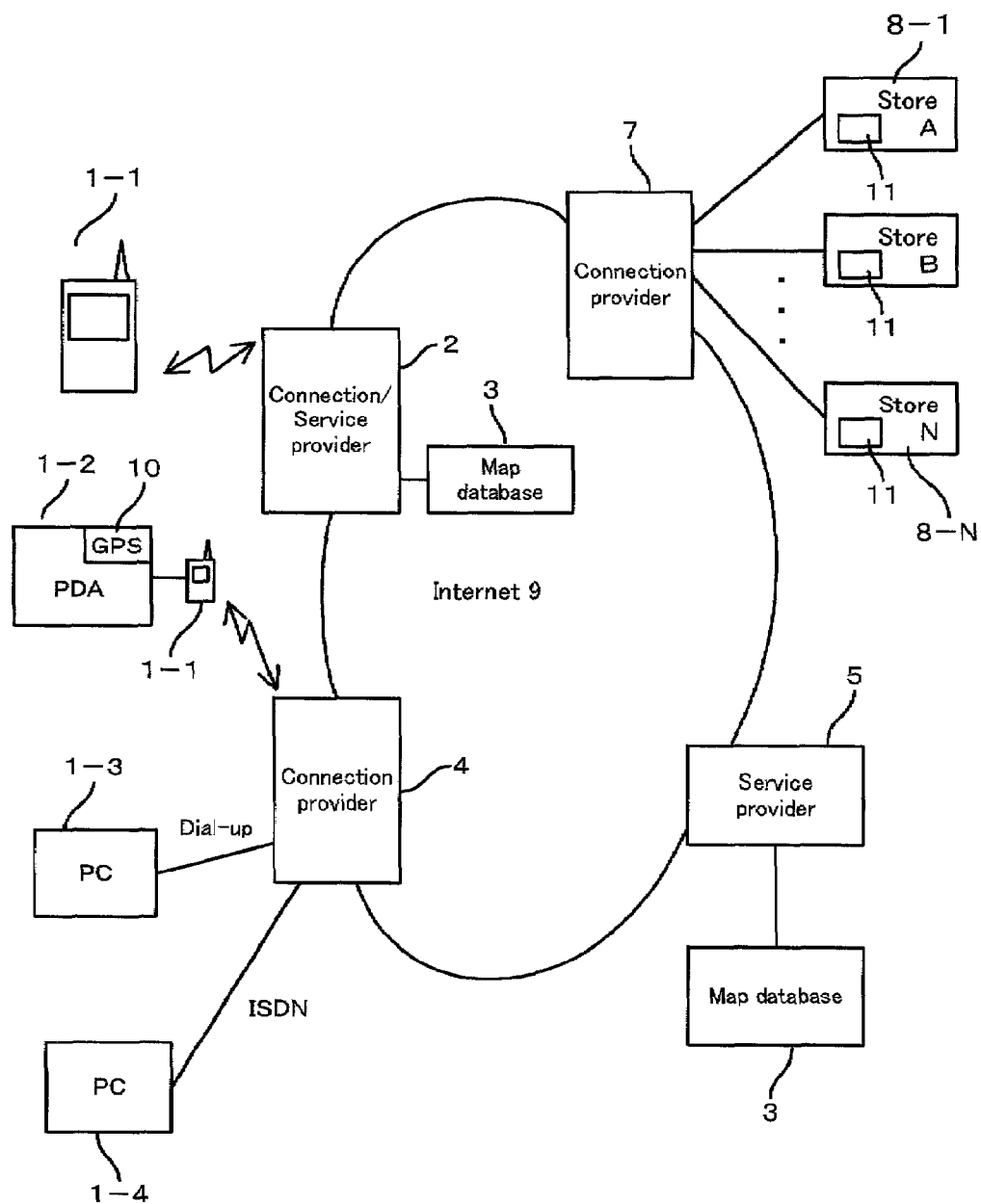
FIG. 1 is a block diagram of a system of an embodiment of the present invention.
Figure 2:
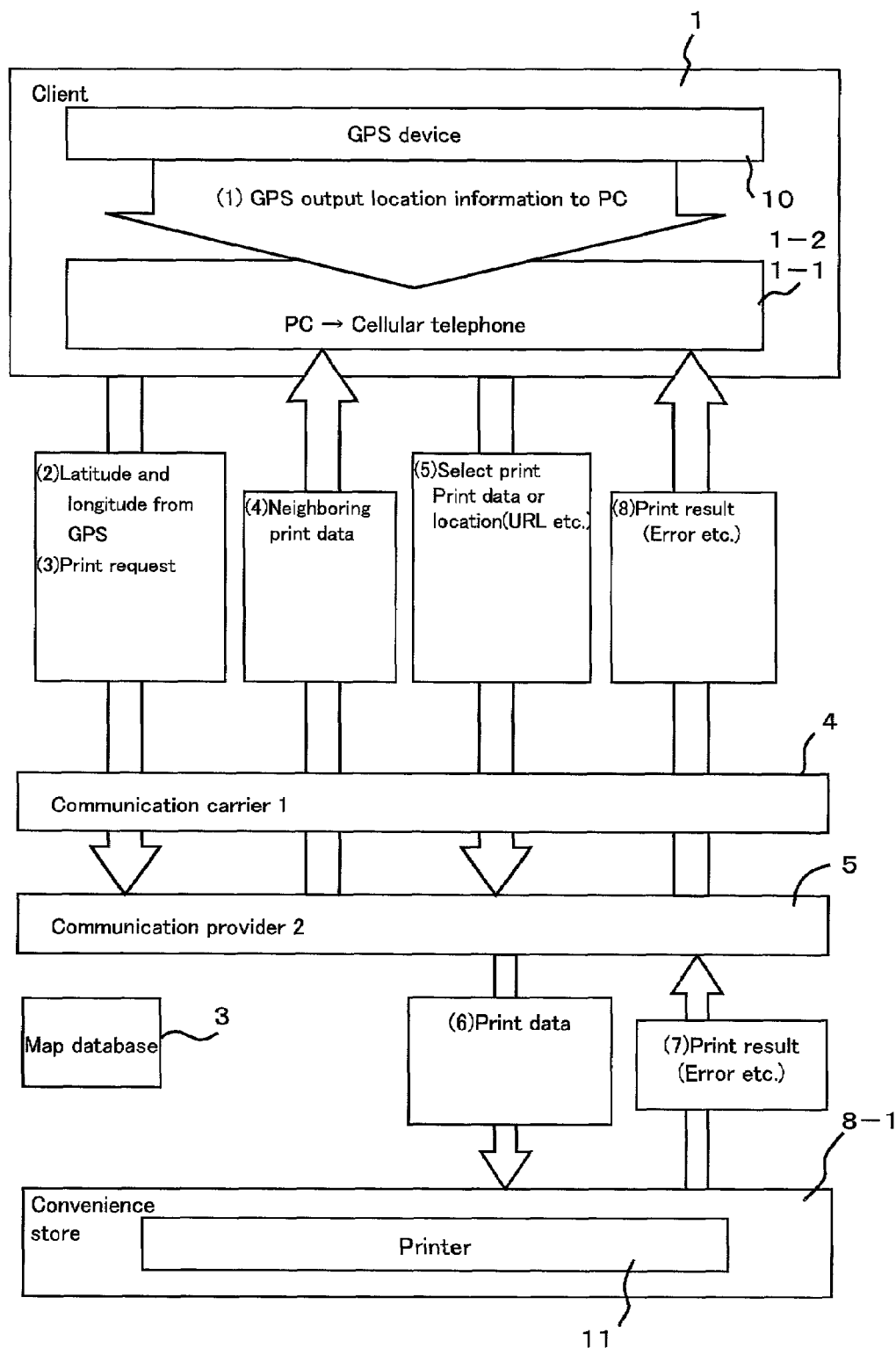
FIG. 2 is an overall flowchart of the printing agent service processing of FIG. 1.
Figure 3:
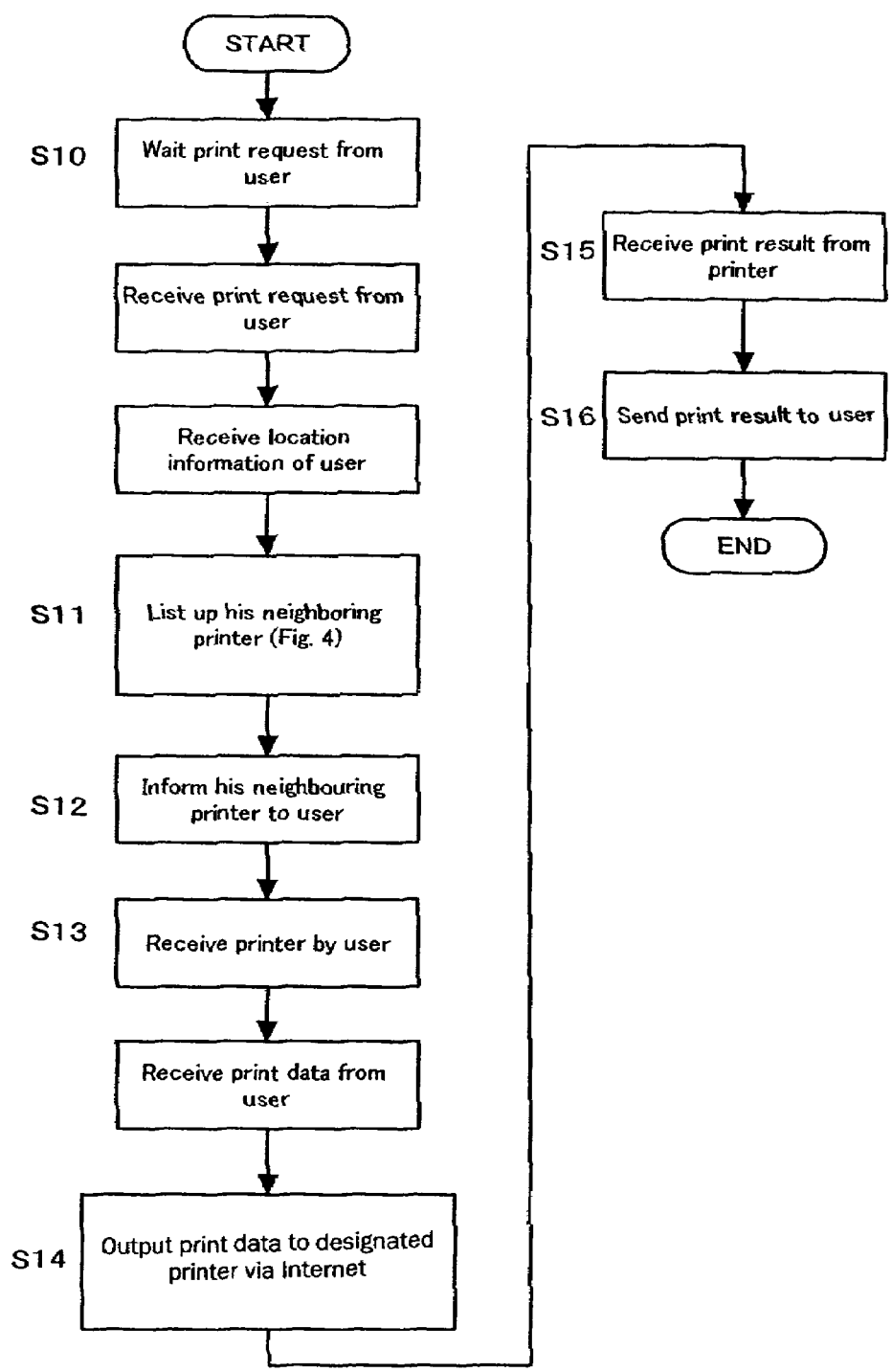
FIG. 3 is a flowchart of the printing agent service processing of FIG. 1.
Figure 4:
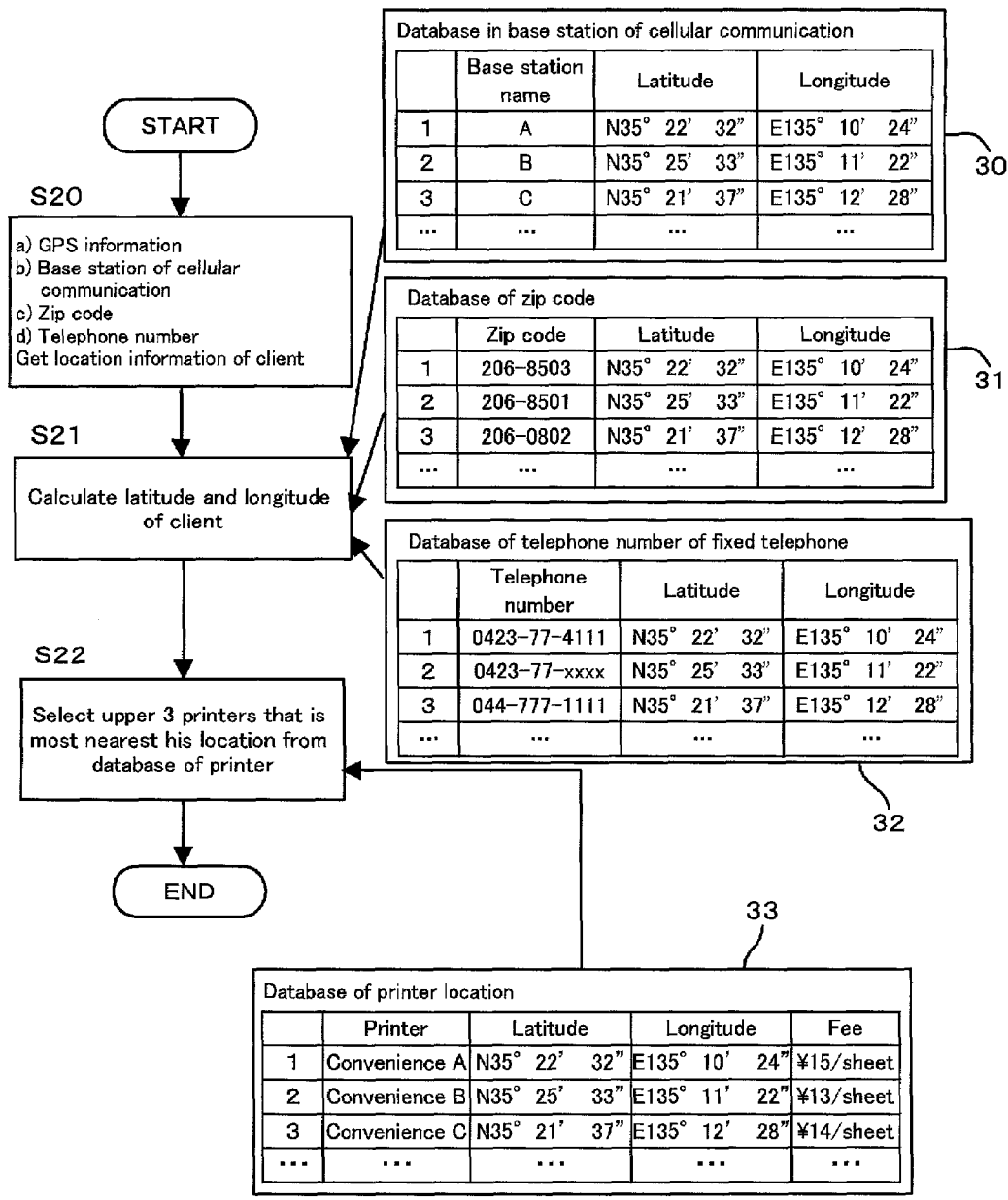
FIG. 4 is a flowchart of the listing up of printing agent sites of FIG. 3.

FIG. 1 is a block diagram of a printing agent service system of a first aspect of the embodiment of the present invention, FIG. 2 is an overall flowchart of the printing agent processing thereof, FIG. 3 is a flowchart of printing agent processing, and FIG. 4 is a flowchart of the listing up processing of FIG. 3.

FIG. 1 shows an example in which printing agent services are performed by a service provider. As shown in FIG. 1, a cellular telephone 1-1, a mobile information equipment 1-2 having a Global Position System (GPS) 10 and notebook and desktop personal computers 1-3, 1-4 are shown as examples of client terminals. The cellular telephone 1-1 may also include GPS 10. The connection/service provider (server) 2 provides connections/services for the cellular telephone 1-1, and, for example, is an NTT DoCoMo "i-Mode" (trade mark) service provider This connection/service provider 2 is connected to a map database 3 that will be described in FIG. 3, and executes the printing agent processing that will be explained in FIG. 2 through FIG. 4. Connection provider (server) 4 provides connection services for personal computers 1-3, 1-4, and mobile equipment 1-2. Service provider (server) 5 is connected to a map database 3 that will be described in FIG. 3, and executes the printing agent processing that will be explained in FIG. 2 through FIG. 4.

Connection provider (server) 7 is connected to printers 11 at a plurality of printing agent stores 8-1 through 8-N. In this example, printing agent stores 8-1 through 8-N are convenience stores. Each provider 2, 4, 5, 7 is connected via the Internet 9.

Next, printing agent processing will be explained on the basis of FIG. 2 by referring to FIG. 3 and FIG. 4.

(1) A printing request is inputted from client terminal 1. Client location information is inputted at this time. FIG. 2 shows an example of a mobile terminal 1-2 having GPS 10, and the mobile terminal 1-2 obtains a current location (longitude, latitude) from the GPS 10. Further, for personal computers 1-3, 1-4, which do not have GPS 10, zip codes and telephone numbers of fixedline telephones are inputted. Furthermore, for cellular telephone 1-1, since the base station of the mobile communications device is connected during communications, the location of cellular telephone 1-1 can be determined by the location of the base station, and does not always have to be inputted. Of course, in a case in which cellular telephone 1-1 has GPS 10, GPS positioning information is inputted.

(2) A print request and location information are communicated to service provider 5 via a cellular telephone carrier and service provider 4.

(3) Service provider 5 receives the print request and location information from a client (S10 of FIG. 3). Next, as needed, the longitude and latitude of the client are calculated, and printing agent stores (printers) nearest to the current location of the client are listed up (S11 of FIG. 3).

This listing up process will be explained in accordance to FIG. 4.

(S20) First, client location information is obtained. This is derived from GPS data, a mobile communications device (cellular telephone) base station, zip codes, and telephone numbers of fixed-line telephones.

(S21) Next, client longitude and latitude are computed. In the map database 3 are provided a database 30 of mobile communications device base stations, a database 31 of zip codes, a database 32 of telephone numbers of fixed-line telephones, and a database 33 of printer sites. When it is GPS information, longitude and latitude are obtained directly from the GPS information. When it is mobile communications device base station information, the database 30 of mobile communications device base stations, which stores the longitudes and latitudes of base stations, is searched, and the longitude and latitude of the client base station is determined. When it is zip codes, the database 31 of zip codes, which stores the longitudes and latitudes of zip codes, is searched, and the longitude and latitude of the client is determined. When it is the telephone numbers of fixed-line telephones, the database 32 of telephone numbers of fixed-line telephones, which stores the longitudes and latitudes of telephone numbers of fixed-line telephones, is searched, and the longitude and latitude of the client is determined.

(S22) In the printer database 33, the stores (convenience store 'A' and so forth) of printers that perform agent printing, the sites (longitude, latitude) thereof, and printing fees are stored in advance. The provider selects the top three printers (agent printing stores) closest to the location (longitude, latitude) of the above-mentioned client from the printer database 33.

(4) This nearby printer information is sent to the client 1, and a selection is awaited (S12).

(5) This printer information is displayed on the screen of the client terminal 1. The client selects the printer (store) from which he wishes to output via terminal 1. Further, print contents (file name, file data) or the Location (URL) of file information is specified. Then, the selected printer (store), print contents, and print information are sent to service provider 5. Service provider 5 receives the selected printer (store), print contents, and print information (S13).

(6) Service provider 5 sends the specified print contents to a printer 11 at the specified store 8-1 by way of the Internet 9 and connection provider 7. In this case, when it is file data, it is sent as-is, and when it is a file name or Location (URL), the file or contents of the site thereof are accessed, the print contents are obtained, and this is sent to the printer 11 (Sl4).

(7) The printer 11 prints the print contents. Then, printing results (error information, number of pages printed, fee and so forth) are reported to provider 5 (S15).

(8) Service provider 5 reports these printing results to client terminal 1, and terminates printing agent services (S16).

The client proceeds to the selected store, receives the printed matter, and pays the fee. In this manner, a client can specify a printing agent store nearest to his current location, can have agent printing performed, and can obtain the required printed matter. This printing agent process was explained using an example in which service provider 5 executes this process, and connection/service provider 2 executes this process in the same manner.

Further, the present invention is not limited to the system of FIG. 1, and, for example, can also be a system of either connection/service provider 2 or service provider 5 only, and a connection provider can also serve as a service provider.

Furthermore, a printing agent service can be constituted so as to limit the client terminal to either any one or a plurality of cellular telephones, mobile equipment, personal computer, and so forth. In addition thereto, the printer 11 can be an Internet-enabled printer, and a printer, a composite machine that also serves as a copying machine, and a composite machine that also serves as a facsimile machine can be used.

(Printing Agent Operation)

Next, a printing agent operation will be explained in accordance with the operation of a client terminal 1. FIGS. 5(A) to 5(C) and FIGS. 6(A) and 6(B) are schematic diagrams of printing agent operations in accordance with a cellular telephone 1-1.

(1) As shown in FIG. 5(A), an i-Mode site is accessed by i-Mode operation of the cellular telephone 1-1, and information (content) is displayed on a screen. In this example, a restaurant guide is being displayed.

(2) As shown in FIG. 5(B), the cellular telephone 1-1 submenu button is pressed, and the submenu is displayed on the screen. In the submenu, there is provided the menu [item] "12: Print."

(3) As shown in FIG. 5(C), the cursor key is used to make the item "12: Print" active on the submenu screen of the cellular telephone 1-1, and the select button is pressed. In accordance therewith, a print request is transmitted to service provider 2, and a search is done for the printer 11 (store) nearest to the client based on the location of the cellular telephone base station.

Figure 6A:
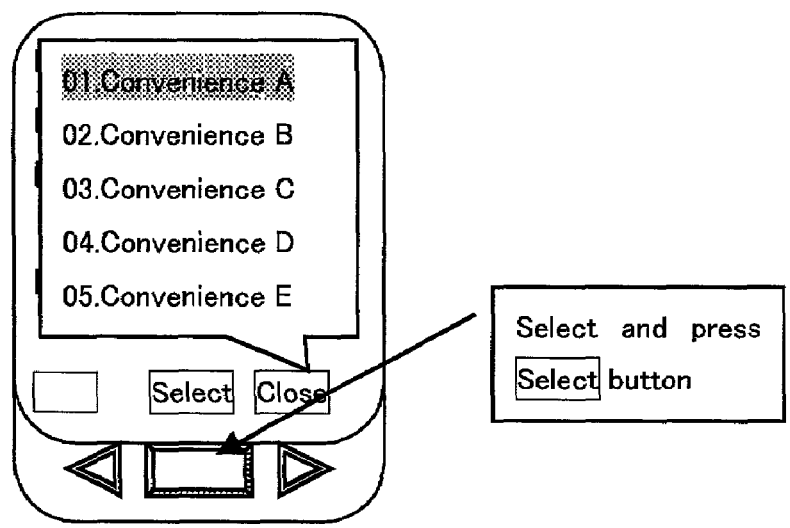
FIGS. 6(A) and 6(B) are schematic diagrams (Part 2) of the operation of a portable terminal of FIG. 1.

(4) As shown in FIG. 6(A), the printer stores (names of convenience stores) retrieved by provider 2 are displayed on the screen of cellular telephone 1-1. The desired printer store (for example, convenience store 'A') is made active using the cursor key, and is selected using the select button. In accordance therewith, the printer store and print information (here, a restaurant guide) are sent to provider 2. Provider 2 obtains the print data based on the print information, and sends same to the selected printer 11. Then the print is performed by the printer 11, and the printing results are received.

Figure 6B:
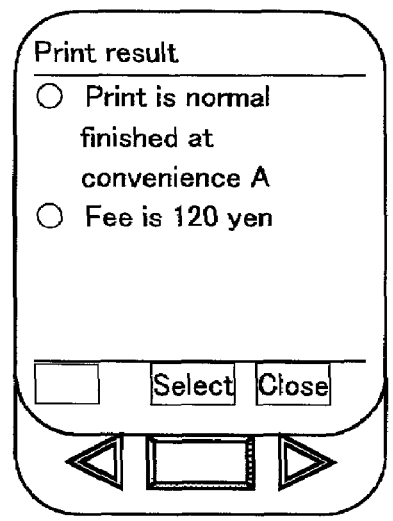

(5) As shown in FIG. 6(B), the printing results are displayed on the screen of cellular telephone 1-1. Here, the fact that printing was performed normally by the printer, and the printing fee are displayed.

In this manner, a client can obtain printed matter on which is printed a map for a restaurant or other such contents of a site accessed via a cellular telephone 1-1 at a printing agent store closest to the location at which the client operated the cellular telephone 1-1. And, because the printing results are displayed, it is clear to the user that printing is complete, and the user can be confident of receiving the printed matter at the store.

Next, the operation of another client terminal will be explained. FIG. 7 through FIG. 12 are schematic diagrams of printing agent operations in accordance with either a mobile terminal or personal computers 1-2, 1-3, 1-4.

(1) As shown in FIG. 7, a printing agent service page is accessed via the Internet from a personal computer, and the printing agent service page is displayed on the screen. In this example, the printing agent procedure is displayed, and fields for inputting a location, selecting an output printer, and specifying print contents to be outputted are displayed. A location is specified via this screen. In this example, as a specification method, any of the three, longitude-latitude, zip code or telephone number can be specified. Longitude and latitude can be inputted by using a GPS 10. Or, a current location ('C' street, 'B' block, 'A' ward and so forth) can be inputted. In accordance therewith, a printing request and an inputted current location are transmitted to service provider 2, and printers 11 (stores) nearest to the client are retrieved from the above-mentioned databases 30–33.

Figure 9:
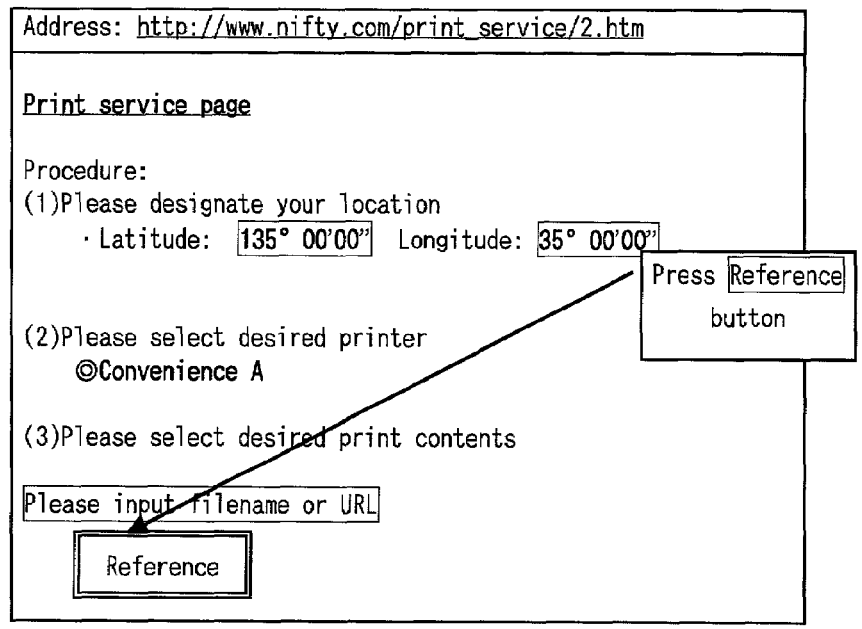
FIG. 9 is a schematic diagram (Part 3) of the operation of a personal computer of FIG. 1.
Figure 10:
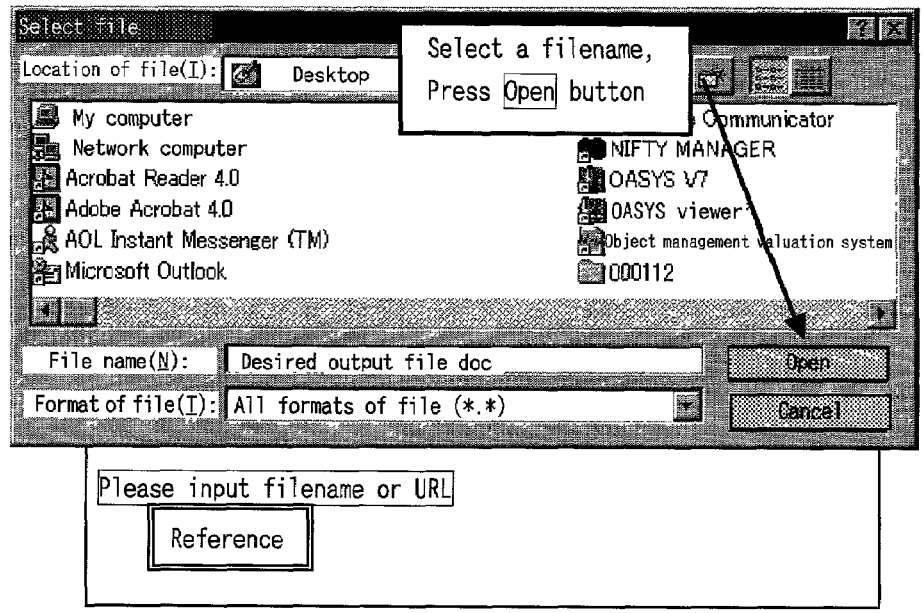
FIG. 10 is a schematic diagram (Part 4) of the operation of a personal computer of FIG. 1.
Figures 11, 12:
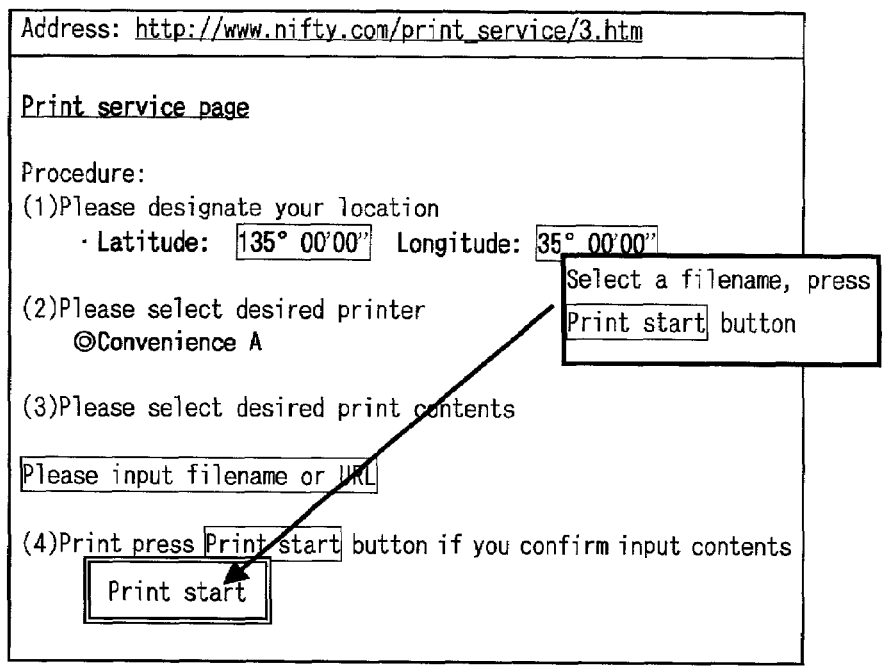
FIG. 11 is a schematic diagram (Part 5) of the operation of a personal computer of FIG. 1.
FIG. 12 is a schematic diagram (Part 6) of the operation of a personal computer of FIG. 1.

(2) As shown in FIG. 8, printer stores (names of convenience store) retrieved by provider 2 are displayed on the screen of personal computer 1-3. The desired printer store (for example, convenience store 'A') is made active using either a pointer or cursor key, and selected. Next, as shown in FIG. 9, a reference icon is clicked. Then, as shown in FIG. 10, the print information to be outputted is selected from a file selection dialog box. For example, a filename or URL is inputted. Or, a filename or URL can be inputted directly without clicking on the reference icon. As shown in FIG. 11, the inputted contents are displayed, the contents are confirmed, and the print start icon is clicked. In accordance therewith, a printer store and print information (here, a filename or URL) are sent to provider 2. Provider 2 obtains print data from the print information, and sends same to the selected printer 11. Then printing is performed by the printer 11, and printing results are received.

(3) As shown in FIG. 12, printing results are displayed on the screen of personal computer 1-3. Here, the print contents, printing store and printing fee are displayed.

In this manner, a client can obtain, at the nearest printing store, printed matter on which is printed a file that has been either specified or accessed by mobile terminal 1-2 or personal computers 1-3, 1-4. And, since printing results are displayed, the user can know that printing is complete, and can be confident of receiving the printed matter at the store.

(Other Aspects of the Embodiment)

Figure 13:
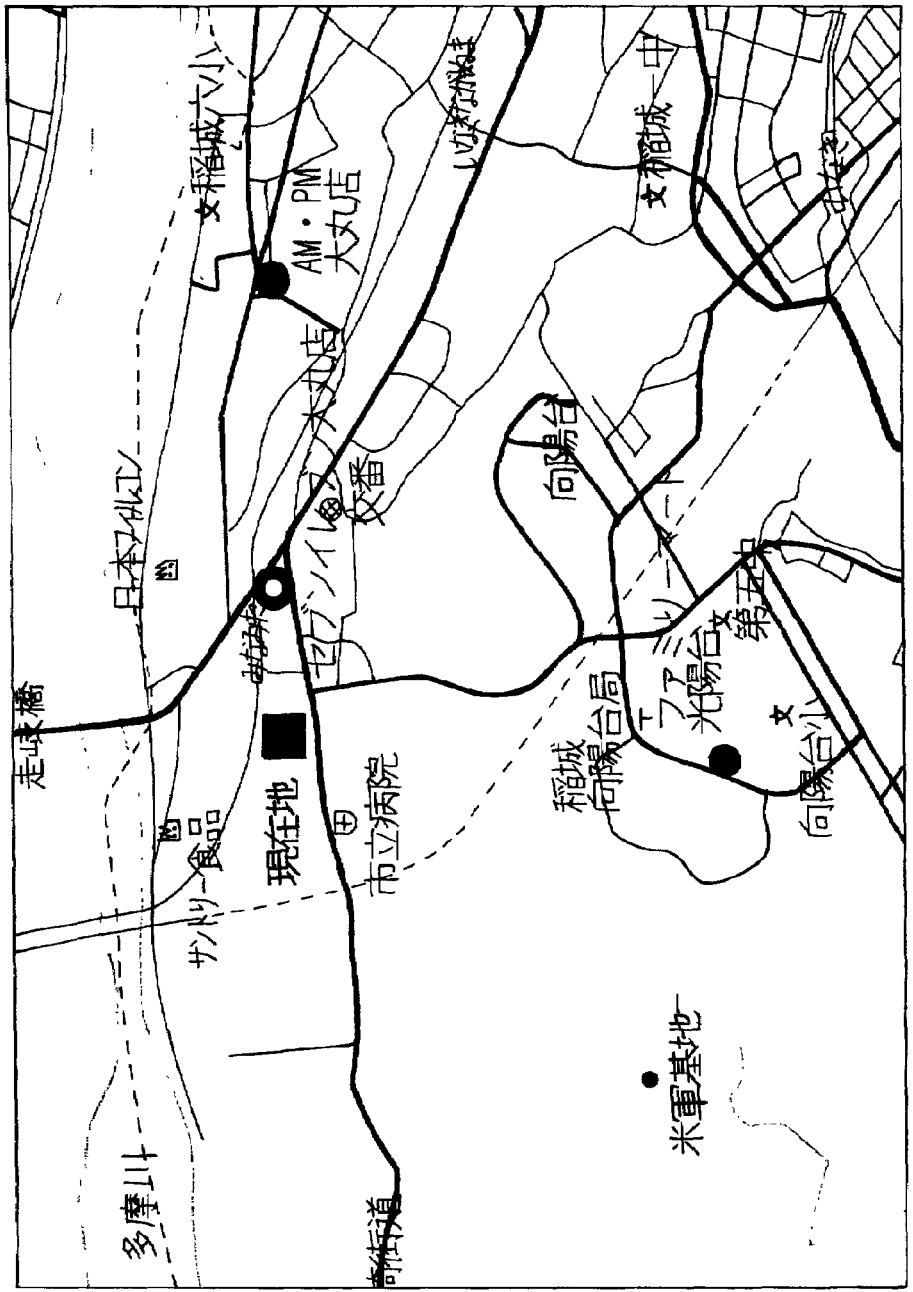
FIG. 13 is a schematic diagram of a display screen at an agent printing printer site of another aspect of the embodiment of the present invention.

FIG. 13 is a schematic diagram of the selection of a printing agent store of another aspect of the embodiment of the present invention, and is a variation of the display of the nearest printing agent store in the aspect of the embodiment of FIG. 1 through FIG. 12. In the above-mentioned example, printing agent stores were listed up in text form, but in this example, printing agent stores are displayed on a map having the current location at its center. By so doing, it is possible to be visually cognizant of the locations of the nearest printing agent stores, enabling selection of a suitable printing agent store.

Figure 14:
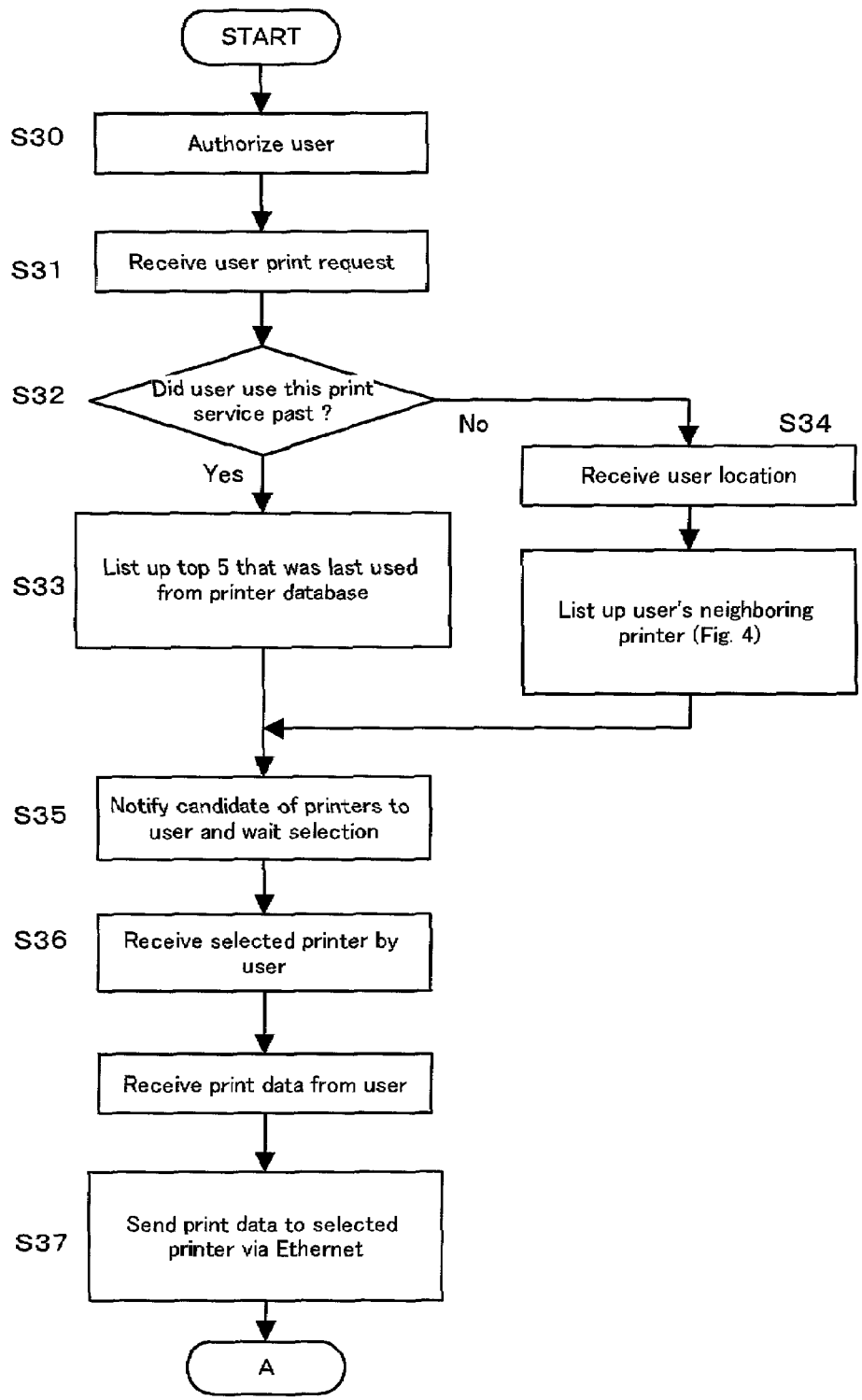
FIG. 14 is a flowchart (Part 1) of agent printing processing of another embodiment of the present invention.
Figure 15:
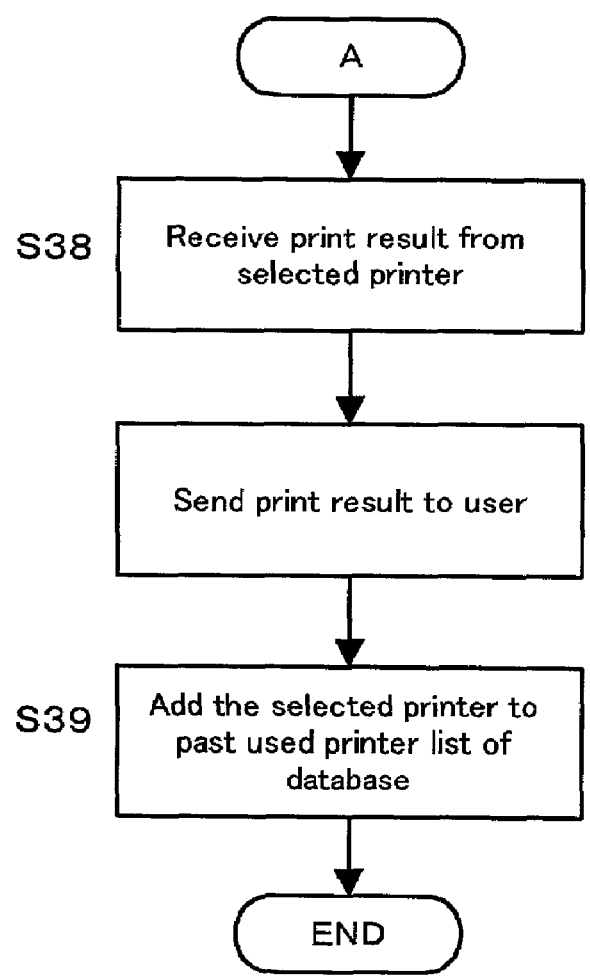
FIG. 15 is a flowchart (Part 2) of agent printing processing of another aspect of the embodiment of the present invention.

FIG. 14 and FIG. 15 are flowcharts of a provider's printing agent processing in another aspect of the embodiment of the present invention.

(S30) A user ID is received from a client terminal 1, and the user is authenticated.

(S31) A print request is received from client terminal 1.

(S32) The provider has a usage database, which stores the utilization history of a user, and printers used in the past. A determination is made from the user ID as to whether or not the user has utilized the printing agent service in the past.

(S33) When it is a user, who has utilized the printing agent service in the past, five recently used printer stores are listed up from the usage database, and processing advances to step S35.

(S34) Conversely, in a case in which it is not a user that has utilized the printing agent service in the past, location information is received from client terminal 1. Next, as explained with FIG. 4, the client's longitude and latitude are computed, and printing agent stores (printers) nearest to the client's current location are listed up.

(S35) This nearby printer information is sent to the client 1, and a selection is awaited.

(S36) Provider 5 receives from client terminal 1 a selected printer (store), print contents, and print information.

(S37) Provider 5 sends the specified print contents to a printer 11 at the specified store 8-1 by way of the Internet 9 and connection provider 7. In this case, if it is file data, it is sent as-is, and if it is a file name or Location (URL), the file or contents of the site thereof are accessed, the print contents are obtained, and this is sent to the printer 11.

(S38) The printer 11 prints the print contents. Then, printing results (error information, number of pages printed, fee and so forth) are reported to provider 5. Provider 5 reports these printing results to client terminal 1.

(S39) The output printer is added to the usage database, and printing agent services are terminated.

The client proceeds to the selected store, receives the printed matter, and pays the fee. In this manner, a client can specify a printing agent store nearest to his current location, can have agent printing performed, and can obtain the required printed matter. Or, in Step S35, in a case in which printer sites utilized in the past are displayed on a priority basis as candidates, but it is not possible to make a selection therefrom, processing moves to Step S34, and the nearest printing sites to the current location are retrieved. Therefore, by adding a method for referencing a past utilization history, a list of nearest printer sites can easily be obtained.

Figure 16:
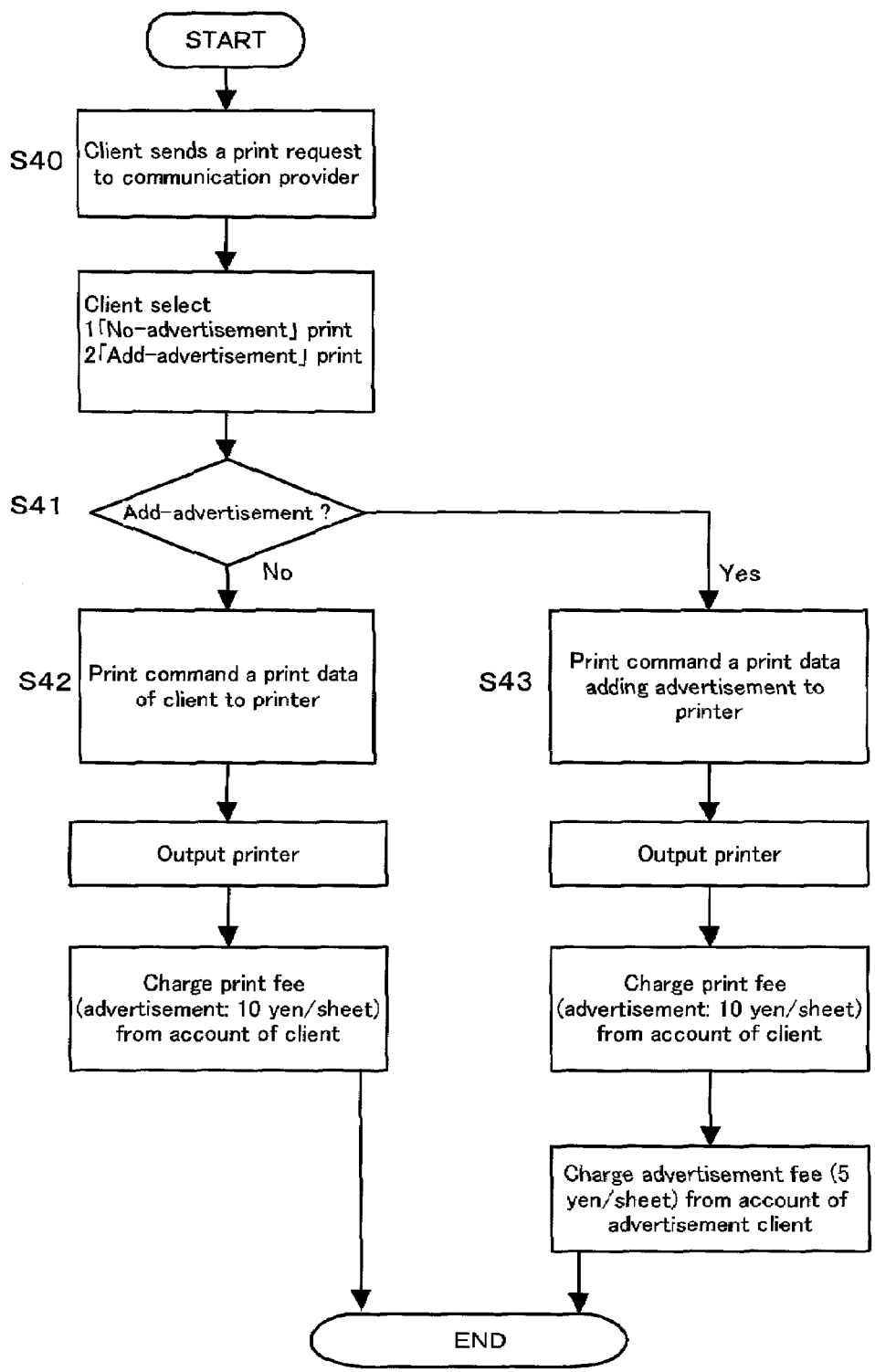
FIG. 16 is a flowchart of agent printing processing of another aspect of the embodiment of the present invention.
Figure 17:
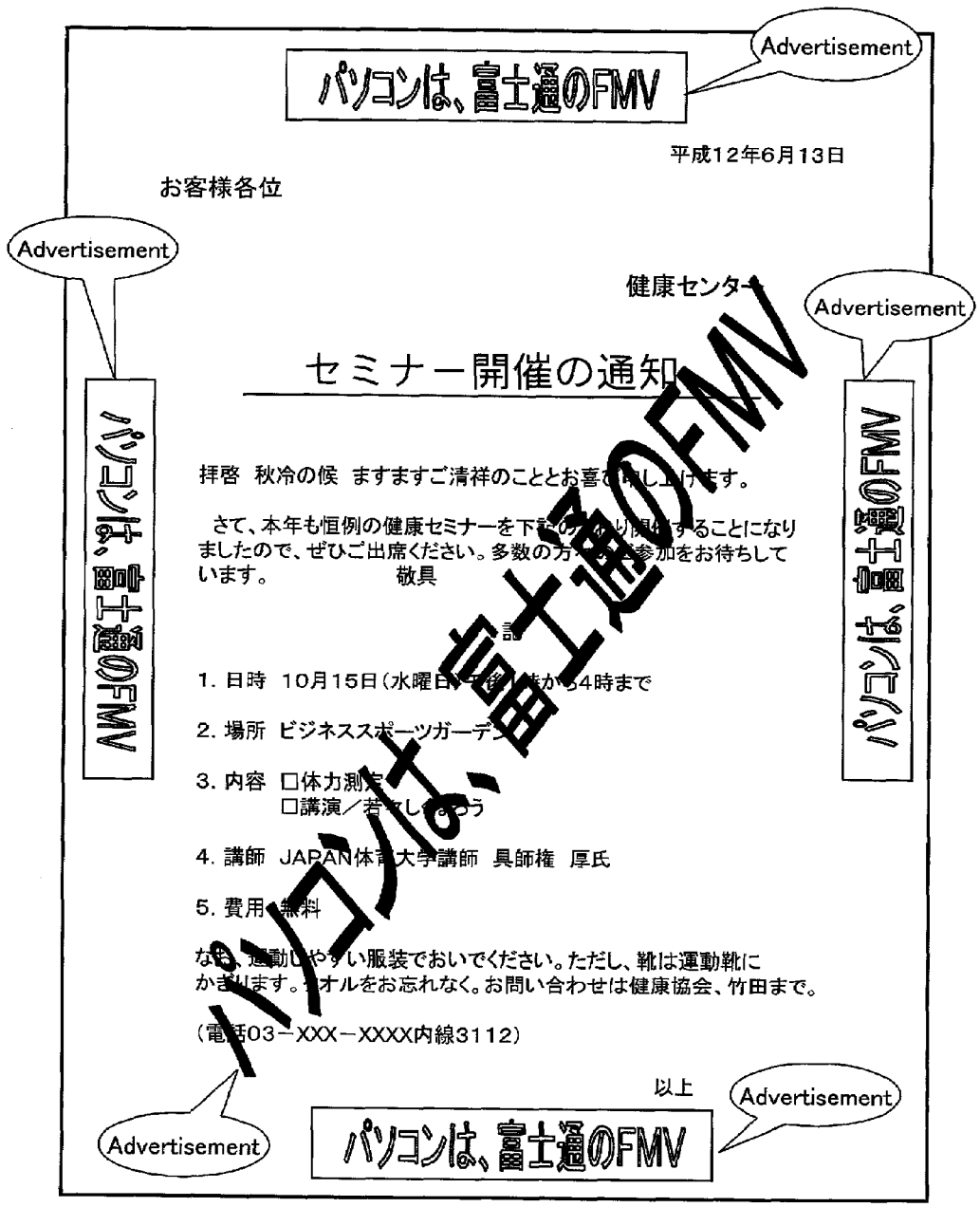
FIG. 17 is a schematic diagram of an example of printing containing an advertisement of FIG. 16.

FIG. 16 is a flowchart of the printing agent process of another aspect of the embodiment of the present invention, and FIG. 17 is a schematic diagram of printed matter, which includes an advertisement. In FIG. 16, because the printer site retrieval and selection processes are the same as the method of FIG. 3 through FIG. 14, [these processes] have been omitted, but a discount process resulting from printing including an advertisement performed via a copying machine has been added.

(S40) A printing agent request, and print conditions indicating either advertisement included or non-advertisement printing are sent to a provider.

(S41) Location information is received from client terminal 1, and printing agent stores (printers) nearest to the current location of the client are listed up. This nearby printer information is sent to the client 1, and a selection is awaited. Provider 5 receives from client terminal 1 a selected printer (store), print contents, and print information. Then, a determination is made as to whether or not the print conditions include an advertisement.

(S42) When an advertisement is not included, provider 5 sends the specified print contents to a printer 11 at the specified store 8-1 by way of the Internet 9 and connection provider 7. The printer 11 prints the print contents. Then, printing results (error information, number of pages printed, fee and so forth) are reported to provider 5. Provider 5 reports these printing results to client terminal 1. Furthermore, provider 5 debits the client's account for a non-advertisement printing fee (for example, 15 yen/page).

(S43) Conversely, when an advertisement is to be included, provider 5 adds advertisement information to the specified print information, and sends the print contents to which the advertisement has been added to a printer 11 at the specified store 8-1 by way of the Internet 9 and connection provider 7. The printer 11 prints the print contents. FIG. 17 shows an example of a printout containing an advertisement. Then, printing results (error information, number of pages printed, fee and so forth) are reported to provider 5. Provider 5 reports these printing results to client terminal 1. Furthermore, provider 5 debits the client's account for an advertisement-included printing fee (for example, 10 yen/page), and debits the account of the advertiser for advertising costs (for example, 5 yen/page).

As shown in FIG. 17, it is desirable to position advertisement printing in the margins, and for other than margin printing, printing that is light in density is desirable. In this manner, it is possible to obtain discount services in accordance with printing that includes an advertisement even in a printing agent service. And advertisement graphics data can be stored in a printer 11, and the latest advertisement graphics can be maintained in the printer at all times by regularly downloading these graphics via a network either at timed intervals, or by selecting times when network traffic is minimal, such as at night or early in the morning.

Further, a client can also specify the printout time of a printer 11. In accordance therewith, a printout is performed either at the time the client arrives at the agent store or thereafter, enabling the client to obtain specified printed matter reliably. Similarly, an operation guidance function can be provided either to a printer 11 or to a personal computer to which this printer 11 is attached, and a client can operate this printer 11 or personal computer at a printing agent store and make a printout.

The present invention has been explained hereinabove in accordance with aspects of the embodiment, but all manner of variations of the present invention are possible within the scope of the gist of the present invention, and these variations are no excluded from the technical scope of the present invention.

(1) Because the current location of a client terminal is detected, printing agent printer sites near the current location of the client terminal are retrieved, and sent to the client terminal as candidates for selection, a client can easily select a printing agent printer that is near his current location. Thus, a client can easily obtain printed matter at the required place.

(2) It will become easy for a service provider to increase service users.

What is claimed is:

1. A printing agent service method, comprising:
receiving a print request and a user ID from a client terminal;
determining whether the user indicated by the user ID has used the printing agent service in the past;
retrieving a plurality of most recently used printing agent printer sites selected in the past by the user indicated by the user ID in response to determining that the user indicated by the user ID has used the printing agent service in the past;
sending to the client terminal, as candidates for printing agent printer sites to be selected by the user, information indicating the plurality of most recently used printing agent printer sites selected in the past by the user indicated by the user ID;
receiving location information from the client terminal when the user ID indicates that the user has not used the printing agent service in the past;
retrieving a printing agent printer site nearest to a location of the client terminal based on the location information obtained in response to the user ID indicating that the user has not used the printing agent service in the past;
sending to the client terminal, as a candidate for a printing agent printer site to be selected by a user, information indicating the printing agent printer site nearest to the location of the client terminal in response to receiving the location information;
selecting a printer agent printing site from the candidate site(s) sent to the client terminal;
receiving the printing agent printer site selected by the client terminal, and sending print data of the print request to a printer at the selected printing agent printer site; and
printing the print data at the selected printing agent printer site when a client who has sent the print request instructs printout at the selected printing agent printer site.

2. A printing agent service system, comprising:
a client terminal to specify a print request, location information and a user ID;
a database for storing printing agent printer sites; and
a server for receiving the print request, the location information and the user ID from the client terminal, and for controlling printing of the print request at a printing agent printer site,
wherein the server determines whether the user indicated by the user ID has used the printing agent service system in-the past, and, in response to determining that the user indicated by the user ID has used the printing agent service system in the past, retrieves from the database and sends to the client terminal a plurality of most recently used printing agent printer sites selected in the past by the user indicated by the user ID as candidates for selection by the user,
wherein the server retrieves from the database and sends to the client terminal, as a candidate for selection by the user, a printing agent printer site nearest to the location of the client terminal based on the location information if the server determines that the user indicated by the user ID has not used the printing agent service in the past,
wherein the server receives from the client terminal a selected printing agent printer site, and sends print information of the print request to a printer at the specified printing agent printer site; and
wherein the printer performs a printout at the selected printing agent printer site when a client who has sent the print request instructs the printout at the selected printing agent printer site.

3. The printing agent service method according to claim 1, wherein the sending steps comprise sending map information showing the nearest printing agent printer site based on the location information.

4. The printing agent service method according to claim 1, wherein the receiving location information from a client terminal comprises receiving GPS information from the client terminal.

5. The printing agent service method according to claim 1, wherein the retrieving a printing agent printer site nearest to a location of the client terminal comprises retrieving a current location of the client terminal based on the location information, and retrieving the printing agent printer site nearest to the current location.

6. The printing agent service method according to claim 1, further comprising:
receiving agent printing results from the printer, and sending the agent printing results to the client terminal.

7. The printing agent service method according to claim 1, further comprising:
automatically debiting a specified account for an agent printing fee in accordance with the agent printing results.

8. The printing agent service method according to claim 1, further comprising:
instructing printing that includes an advertisement to the printer in accordance with an advertisement-included printing specification from the client terminal; and
discounting a printing fee in accordance with the agent printing that includes an advertisement.

9. The printing agent service method according to claim 1, further comprising:
sending an agent printing fee to the client terminal in accordance with the agent printing results.

10. The printing agent service system according to claim 2, wherein the server sends map information showing the nearest printing agent printer site based on the location information.

11. The printing agent service system according to claim 2, wherein the server receives GPS information from the client terminal.

12. The printing agent service system according to claim 2, wherein the server retrieves the current location of the client terminal based on the location information, and thereafter, retrieves a printing agent printer site nearest to the current location.

13. The printing agent service system according to claim 2, wherein the server receives agent printing results from the printer, and sends the agent printing results to the client terminal.

14. The printing agent service system according to claim 2, wherein the server automatically debits a specified account for an agent printing fee in accordance with the agent printing results.

15. The printing agent service system according to claim 2, wherein the server instructs printing that includes an advertisement to the printer in accordance with an advertisement-included printing specification from the client terminal, and discounts a printing fee in accordance with the agent printing that includes an advertisement.

16. The printing agent service system according to claim 2, wherein the server sends an agent printing fee to the client terminal in accordance with the agent printing results.

* * * * *